(12) United States Patent
Toncich et al.

(10) Patent No.: US 8,478,205 B2
(45) Date of Patent: Jul. 2, 2013

(54) SYSTEM AND METHOD FOR FILTERING TIME DIVISION MULTIPLE ACCESS TELEPHONE COMMUNICATIONS

(75) Inventors: Stanley S. Toncich, San Diego, CA (US); Craig Lilja, Imperial Beach, CA (US)

(73) Assignee: KYOCERA Corporation, Kyoto (JP)

( * ) Notice: Subject to any disclaimer, the term of this patent is extended or adjusted under 35 U.S.C. 154(b) by 400 days.

(21) Appl. No.: 12/762,284

(22) Filed: Apr. 16, 2010

(65) Prior Publication Data

US 2010/0203879 A1 Aug. 12, 2010

Related U.S. Application Data

(62) Division of application No. 10/452,464, filed on Jun. 2, 2003, now Pat. No. 7,720,443.

(51) Int. Cl.
*H04B 1/38* (2006.01)

(52) U.S. Cl.
USPC .......................................................... 455/73

(58) Field of Classification Search
None
See application file for complete search history.

(56) References Cited

U.S. PATENT DOCUMENTS

| | | | |
|---|---|---|---|
| 3,239,838 A | 3/1966 | Kelleher | |
| 3,413,543 A | 11/1968 | Schubring et al. | |
| 3,569,795 A | 3/1971 | Gikow | |
| 3,676,803 A | 7/1972 | Simmons | |
| 3,678,305 A | 7/1972 | Paige | |
| 3,680,135 A | 7/1972 | Boyer | |
| 3,737,814 A | 6/1973 | Pond | |
| 3,739,299 A | 6/1973 | Adler | |
| 3,836,874 A | 9/1974 | Maeda et al. | |
| 3,918,012 A | 11/1975 | Peuzin | |
| 4,122,400 A | 10/1978 | Medendorp et al. | |
| 4,236,125 A | 11/1980 | Bernard et al. | |
| 4,475,108 A | 10/1984 | Moser | |
| 4,484,157 A | 11/1984 | Helle et al. | |
| 4,494,081 A | 1/1985 | Lea et al. | |
| 4,525,720 A | 6/1985 | Corzine et al. | |

(Continued)

FOREIGN PATENT DOCUMENTS

| | | |
|---|---|---|
| DE | 40 36 866 A1 | 7/1991 |
| DE | 100 24 483 | 11/2001 |

(Continued)

OTHER PUBLICATIONS

A. Presser, "Varactor-Tunable, High-Q Microwave Filter," RCA Review, vol. 42, Dec. 1981, pp. 691-705.

(Continued)

*Primary Examiner* — Yuwen Pan
*Assistant Examiner* — Ayodeji Ayotunde

(57) ABSTRACT

A system and method are presented for transceiving Time Division Multiple Access (TDMA) telephone communications through a common filter. The system includes a tunable ferro-electric bandpass filter (FE BPF), a controller, a low noise amplifier (LNA), and a power amplifier (PA). The FE BPF has a control input to accept tuning voltage signals from the controller and two signal ports. In response to the tuning voltage signals, the FE BPF selects a transmit or receive frequency passband between the signal ports. The FE BPF first signal port is connected to the LNA and the PA and the FE BPF second signal port is connected to an antenna in a wireless device. The LNA and PA are activated and deactivated in response to control signals from the controller.

14 Claims, 2 Drawing Sheets

U.S. PATENT DOCUMENTS

| | | | |
|---|---|---|---|
| 4,626,800 A | 12/1986 | Murakami et al. | |
| 4,733,328 A | 3/1988 | Blazej | |
| 4,736,169 A | 4/1988 | Weaver et al. | |
| 4,737,797 A | 4/1988 | Siwiak et al. | |
| 4,746,925 A | 5/1988 | Toriyama | |
| 4,792,939 A | 12/1988 | Hikita et al. | |
| 4,799,066 A | 1/1989 | Deacon | |
| 4,835,499 A | 5/1989 | Pickett | |
| 4,835,540 A | 5/1989 | Haruyama et al. | |
| 4,847,626 A | 7/1989 | Kahler et al. | |
| 4,908,853 A | 3/1990 | Matsumoto | |
| 4,975,604 A | 12/1990 | Barta | |
| 5,166,857 A | 11/1992 | Avanic et al. | |
| 5,173,709 A | 12/1992 | Lauro et al. | |
| 5,212,463 A | 5/1993 | Babbitt et al. | |
| 5,216,392 A | 6/1993 | Fraser et al. | |
| 5,227,748 A | 7/1993 | Sroka | |
| 5,231,407 A | 7/1993 | McGirr et al. | |
| 5,293,408 A | 3/1994 | Takahashi et al. | |
| 5,307,033 A | 4/1994 | Koscica et al. | |
| 5,325,099 A | 6/1994 | Nemit et al. | |
| 5,388,021 A | 2/1995 | Stahl | |
| 5,406,163 A | 4/1995 | Carson et al. | |
| 5,416,803 A | 5/1995 | Janer | |
| 5,427,988 A | 6/1995 | Sengupta et al. | |
| 5,450,092 A | 9/1995 | Das | |
| 5,451,915 A | 9/1995 | Katzin et al. | |
| 5,459,123 A | 10/1995 | Das | |
| 5,472,935 A | 12/1995 | Yandrofski et al. | |
| 5,479,139 A | 12/1995 | Koscica et al. | |
| 5,495,215 A | 2/1996 | Newell et al. | |
| 5,496,795 A | 3/1996 | Das | |
| 5,496,796 A | 3/1996 | Das | |
| 5,502,422 A | 3/1996 | Newell et al. | |
| 5,525,942 A | 6/1996 | Horii et al. | |
| 5,557,286 A | 9/1996 | Varadan | |
| 5,561,307 A | 10/1996 | Mihara et al. | |
| 5,561,407 A | 10/1996 | Koscica et al. | |
| 5,564,086 A | 10/1996 | Cygan et al. | |
| 5,574,410 A | 11/1996 | Collins et al. | |
| 5,577,025 A | 11/1996 | Skinner | |
| 5,583,524 A | 12/1996 | Milroy | |
| 5,589,845 A | 12/1996 | Yandrofski et al. | |
| 5,600,279 A | 2/1997 | Mori | |
| 5,617,104 A | 4/1997 | Das | |
| 5,640,042 A | 6/1997 | Koscica et al. | |
| 5,649,306 A | 7/1997 | Vannatta et al. | |
| 5,652,599 A | 7/1997 | Wallace et al. | |
| 5,673,188 A | 9/1997 | Lusher et al. | |
| 5,701,595 A | 12/1997 | Green, Jr. | |
| 5,721,194 A | 2/1998 | Yandrofski et al. | |
| 5,729,239 A | 3/1998 | Rao | |
| 5,777,524 A | 7/1998 | Wojewoda et al. | |
| 5,777,839 A | 7/1998 | Sameshina et al. | |
| 5,778,308 A | 7/1998 | Sroka et al. | |
| 5,830,591 A | 11/1998 | Sengupta et al. | |
| 5,834,975 A | 11/1998 | Bartlett et al. | |
| 5,864,932 A | 2/1999 | Evans et al. | |
| 5,870,670 A | 2/1999 | Ripley | |
| 5,880,921 A | 3/1999 | Tham et al. | |
| 5,887,020 A * | 3/1999 | Smith et al. | 375/130 |
| 5,889,852 A | 3/1999 | Rosecrans et al. | |
| 5,892,486 A | 4/1999 | Cook et al. | |
| 5,908,811 A * | 6/1999 | Das | 505/210 |
| 5,910,994 A | 6/1999 | Lane et al. | |
| 5,945,887 A | 8/1999 | Makino et al. | |
| 5,965,494 A | 10/1999 | Terashima et al. | |
| 5,973,567 A | 10/1999 | Heal et al. | |
| 5,973,568 A | 10/1999 | Shapiro et al. | |
| 5,977,917 A | 11/1999 | Hirose | |
| 5,986,515 A | 11/1999 | Sakurai | |
| 5,987,314 A | 11/1999 | Saito | |
| 5,990,766 A | 11/1999 | Zhan | |
| 6,008,659 A | 12/1999 | Traynor | |
| 6,018,282 A | 1/2000 | Tsuda | |
| 6,020,787 A | 2/2000 | Kim et al. | |
| 6,026,311 A | 2/2000 | Willemsen Cortes et al. | |
| 6,028,561 A | 2/2000 | Takei | |
| 6,049,726 A | 4/2000 | Gruenwald et al. | |
| 6,052,036 A | 4/2000 | Enstrom et al. | |
| 6,054,908 A | 4/2000 | Jackson | |
| 6,084,951 A | 7/2000 | Smith et al. | |
| 6,094,588 A | 7/2000 | Adam | |
| 6,097,263 A | 8/2000 | Mueller et al. | |
| 6,101,102 A | 8/2000 | Brand et al. | |
| 6,108,191 A | 8/2000 | Bruchhaus et al. | |
| 6,108,526 A * | 8/2000 | van der Plas | 455/78 |
| 6,160,524 A | 12/2000 | Wilber | |
| 6,181,777 B1 | 1/2001 | Kiko | |
| 6,198,441 B1 | 3/2001 | Okabe et al. | |
| 6,216,020 B1 | 4/2001 | Findikoglu | |
| 6,242,843 B1 | 6/2001 | Pohjonen et al. | |
| 6,272,336 B1 | 8/2001 | Appel et al. | |
| 6,278,383 B1 | 8/2001 | Endo et al. | |
| 6,281,023 B2 | 8/2001 | Eastep et al. | |
| 6,281,534 B1 | 8/2001 | Arita et al. | |
| 6,285,337 B1 | 9/2001 | West et al. | |
| 6,292,143 B1 | 9/2001 | Romanofsky | |
| 6,294,964 B1 | 9/2001 | Satoh | |
| 6,308,051 B1 | 10/2001 | Atokawa | |
| 6,327,463 B1 | 12/2001 | Welland | |
| 6,329,959 B1 | 12/2001 | Varadan et al. | |
| 6,333,719 B1 | 12/2001 | Varadan | |
| 6,335,710 B1 | 1/2002 | Falk et al. | |
| 6,344,823 B1 | 2/2002 | Deng | |
| 6,359,444 B1 | 3/2002 | Grimes | |
| 6,362,690 B1 | 3/2002 | Tichauer | |
| 6,362,784 B1 | 3/2002 | Kane et al. | |
| 6,362,789 B1 | 3/2002 | Trumbull et al. | |
| 6,384,785 B1 | 5/2002 | Kamogawa et al. | |
| 6,404,304 B1 | 6/2002 | Kwon et al. | |
| 6,421,016 B1 | 7/2002 | Philips et al. | |
| 6,456,236 B1 | 9/2002 | Hauck et al. | |
| 6,462,628 B2 | 10/2002 | Kondo et al. | |
| 6,489,860 B1 | 12/2002 | Ohashi | |
| 6,503,786 B2 | 1/2003 | Klodzinski | |
| 6,518,850 B1 | 2/2003 | Falk et al. | |
| 6,518,920 B2 | 2/2003 | Proctor, Jr. et al. | |
| 6,522,220 B2 | 2/2003 | Yamada et al. | |
| 6,525,630 B1 | 2/2003 | Zhu et al. | |
| 6,525,691 B2 | 2/2003 | Varadan et al. | |
| 6,531,936 B1 | 3/2003 | Chiu et al. | |
| 6,535,748 B1 | 3/2003 | Vuorio et al. | |
| 6,559,737 B1 | 5/2003 | Nagra et al. | |
| 6,571,110 B1 | 5/2003 | Patton et al. | |
| 6,600,456 B2 | 7/2003 | Gothard et al. | |
| 6,653,977 B1 | 11/2003 | Okabe et al. | |
| 6,667,723 B2 | 12/2003 | Forrester | |
| 6,686,817 B2 | 2/2004 | Zhu et al. | |
| 6,721,293 B1 | 4/2004 | Komulainen et al. | |
| 6,727,535 B1 | 4/2004 | Sengupta et al. | |
| 6,819,203 B2 | 11/2004 | Taniguchi | |
| 6,842,086 B1 | 1/2005 | Zennamo et al. | |
| 6,873,294 B1 | 3/2005 | Anderson et al. | |
| 6,898,450 B2 | 5/2005 | Eden et al. | |
| 6,985,113 B2 | 1/2006 | Nishimura et al. | |
| 6,987,486 B2 | 1/2006 | Kurjenheimo et al. | |
| 2001/0026243 A1 | 10/2001 | Koitsalu et al. | |
| 2001/0043159 A1 | 11/2001 | Masuda et al. | |
| 2002/0049064 A1 | 4/2002 | Banno | |
| 2002/0149526 A1 | 10/2002 | Tran et al. | |
| 2002/0149535 A1 | 10/2002 | Toncich | |
| 2002/0175878 A1 | 11/2002 | Toncich | |
| 2003/0062971 A1 | 4/2003 | Toncich | |
| 2003/0134665 A1 | 7/2003 | Kato et al. | |
| 2003/0169206 A1 | 9/2003 | Egawa | |
| 2004/0087280 A1 | 5/2004 | Watanabe et al. | |
| 2004/0152429 A1 * | 8/2004 | Haub et al. | 455/102 |
| 2004/0162047 A1 | 8/2004 | Kasahara et al. | |
| 2004/0196121 A1 | 10/2004 | Toncich | |
| 2004/0204145 A1 | 10/2004 | Nagatomo | |
| 2004/0207722 A1 | 10/2004 | Koyama et al. | |
| 2004/0263411 A1 | 12/2004 | Fabrega-Sanchez et al. | |
| 2005/0007291 A1 | 1/2005 | Fabrega-Sanchez et al. | |

FOREIGN PATENT DOCUMENTS

| | | |
|---|---|---|
| DE | 101 37 753 | 2/2003 |
| EP | 0 125 586 | 11/1984 |
| EP | 0 346 089 | 12/1989 |
| EP | 0472319 A1 | 2/1992 |
| EP | 0 473 373 | 3/1992 |
| EP | 0 531 125 | 3/1993 |
| EP | 0 631 399 | 12/1994 |
| EP | 0 637 131 A1 | 2/1995 |
| EP | 0 638 953 A1 | 2/1995 |
| EP | 0 680 108 A1 | 4/1995 |
| EP | 0 795 922 A1 | 9/1997 |
| EP | 0 843 374 A2 | 5/1998 |
| EP | 0 881 700 A1 | 5/1998 |
| EP | 0 854 567 | 7/1998 |
| EP | 0 872 953 | 10/1998 |
| EP | 0 892 459 | 1/1999 |
| EP | 0 909 024 A2 | 4/1999 |
| EP | 1 043 741 A2 | 10/2000 |
| EP | 1 058 333 | 12/2000 |
| EP | 1 248 317 | 10/2002 |
| GB | 2 240 227 | 7/1991 |
| JP | 63 128618 | 6/1988 |
| JP | 05182857 | 7/1993 |
| JP | 2001338839 | 12/2001 |
| WO | WO 82/03510 | 10/1982 |
| WO | WO 94/13028 | 6/1994 |
| WO | WO 94/27376 A | 11/1994 |
| WO | WO 9427376 A1 * | 11/1994 |
| WO | WO 00/28613 | 5/2000 |
| WO | WO 00/35042 | 6/2000 |
| WO | WO 00/62367 | 10/2000 |
| WO | WO 00/79645 A1 | 12/2000 |
| WO | WO 00/79648 A1 | 12/2000 |
| WO | WO 03/058759 | 7/2001 |
| WO | WO 02/084798 | 10/2002 |

OTHER PUBLICATIONS

C. Chang and T. Itoh. "Microwave Active Filters Based on Coupled Negative Resistance Method," IEEE Transactions on Microwave Theory and Techniques, vol. 38, No. 12, Dec. 1990, pp. 1879-1884.
P. Katzin, B. Bedard, Y. Ayasli, "Narrow-Band MMIC Filters with Automatic Tuning and Q-Factor Control," 1993 IEEE MTT-S Digest pp. 403-406.
B. Hopf, I. Wolff, M.Guglielmi, "Coplanar MMIC Active Bandpass Filters Using Negatlive Resistance Circuits," 1994 IEEE MTT-S Digest pp. 1183-1185.
J. Karacaoglu and I. D. Robertson, "High Selectivity Varactor-Tuned MMIC Bandpass Filter Using Lossless Active Resonators," 1994 IEEE MTT-S Digest, pp. 1191-1194.
B. Nauta, "A CMOS Transconductance-C Filter Technique for Very High Frequencies," IEEE Journal of Solid-State Circuits, vol. 27, No. 2, Feb. 1992, pp. 142-153.
K. Fujita, H. Itoh, R. Yamamoto, "A 15.6 GHz Commercially Based 1/8 GaAs Dynamic Prescaler," 1989 IEEE GaAs IC Symposium, pp. 113-116.
J. Smuk, P. Katzin, "MMIC Phase Locked L-S Band Oscillators." 1994 GaAs IC Symposium Digest, pp. 27-29.
S. R. Chandler, I. C. Hunter, J. G. Gardiner, "Active Varactor Tunable Bandpass Filter," IEEE Microwave and Guided Wave Letters, vol. 3, No. 3, Mar. 1993.
I. C. Hunter, J. D. Rhodes, "Electronically Tunable Microwave Bandpass Filters," IEEE Transactions on Microwave Theory and Techniques, vol. MTT-30, No. 9, Sep. 1982, pp. 1354-1367.
S. Toyoda, "Quarter-Wavelength Coupled Variable Bandstop and Bandpass Filter Using Varactor Diodes," IEEE Transactions on Microwave Theory and Techniques, vol. MTT-30, No. 9, Sep. 1982, pp. 1387-1389.
B. Yu.Kapilevich, "Variety of Approaches to Designing Microwave Active Filers," Proc. 27th European Microwave Conf., Jerusalem, vol. 1, 1997, pp. 397-408.
B. Kapilevich, "Understand the Operation of Channelized Active Filters," Microwaves & RF, Jan. 1997, pp. 89-92.
M. Dishall, "Alignment and Adjustment of Synchronously Tuned Multiple-Resonant-Circuit Filters," Proceedings of the IRE 39, Nov. 1951, pp. 1448-1455.
S. Cohn, "Dissipation Loss in Multiple-Coupled-Resonator Filters," Proceedings of the IRE 47, Aug. 1959, pp. 1342-1348.
G. L. Matthaei, "An Electronically Tunable Up-Convertor," Proceedings of the IRE 49, Nov. 1961, pp. 1703-1704.
E. G. Fubini, E. A. Guillemin, "Minimum Insertion Loss Filters," Proceedings of the IRE 47, Jan. 1959, pp. 37-41.
W. J. Getsinger, "Prototypes for Use in Broadbanding Reflection Amplifiers," IEEE Transactions on Microwave Theory and Techniques, PTGMTT-11, Nov. 1963, pp. 486-497.
E. S. Kuh, M. Fukada, "Optimum Synthesis of Wide-Band Parametric Amplifiers and Converters," IRE Transactons on Circuit Theory, PCCT-8, Dec. 1961, pp. 410-415.
W. J. Getsinger, G. L. Mattaei, "Some Aspects of the Design of Wide-Band Up-Converters and Nondegenerate Parametric Amplifiers," IEEE Transactions on Microwave Theory and Techniques, PTGMTT-12, Jan. 1964, pp. 77-87.
R. L. Sleven, "Design of a Tunable Multi-Cavity Waveguide Band-Pass Filter," 1959 IRE National Convention Record, Part 3, pp. 91-112.
J. J. Taub, B. F. Bodner, "Design of Three-Resonator Dissipative Band-Pass Filters Having Minimum Insertion Loss," Proceedings of the IRE 45, May 1957, pp. 681-687.
K. L. Kotzebue. "Broadband Electronically-Tuned Microwave Filters," 1960 IRE Wescon Convention Record, Part 1, pp. 21-27.
J. P. Louhos, I. Pankinaho, "Electrical Tuning of Integrated Mobile Phone Antennas," Nokia Mobile Phones, Sep. 15, 1999, pp. 69-97.
P. K. Panayi, M. Al-Nuaimi, L. P. Ivrissimtzis, "Tuning Techniques for the Planar Inverted-F Antenna," National Conference on Antennas and Propagation Publication, No. 461, Apr. 1999, pp. 259-262.
Satoshi Makioka et al, "A High Efficiency GaAs MCM Power Amplifier for 1.9GHz Digital Cordless Telephones," IEE 1994 Microwave and Millimeter-Wave Monolithic Circuits Symposium, 1994, pp. 51-54.
V. K. Varadan, K. A. Jose, V. V. Varadan, "Design and Development of Electronically Tunable Microstrip Antennas," IOP Publishing Ltd., 1999, pp. 238.242.
Communication Relating to the Results of the Partial International Search: PCT/IB 02/01077 (2002).
International Search Report: PCT/IB 02/01086 (Jun. 24, 2002).
International Search Report: PCT/IB 02/01078 (Jul. 10, 2002).
International Search Report: PCT/IB01087 (Jul. 19, 2002).
International Search Report: PCT/IB 02/01107 (Jul. 11, 2002).
International Search Report: PCT/IB 02/01120 (Jul. 11, 2002).
International Search Report: PCT/IB 02/01098 (Jul. 4, 2002).
International Search Report: PCT/IB 02/01082 (Jul. 8, 2002).
International Search Report: PCT/IB 02/01144 (Jul. 12, 2002).
International Search Report: PCT/IB 02/01026 (Jun. 28, 2002).
International Search Report: PCT/IB 02/01027 (Jun. 25, 2002).
Cuthbert, T., "Broadband Impedance Matching—Fast and Simple", RF Design, Cardiff Publishing Co., vol. 17, No. 12, Nov. 1994, pp. 38, 42, 44, 48, XP000477834.
Erker et al., "Monolithic Ka-Band Phase Shifter Using Voltage Tunable BaSrTiO3 Parallel Plate Capacitors", IEEE Microwave and Guided Wave Letters, IEEE Inc., vol. 10, No. 1, Jan. 2000, pp. 10-12 XP-000930368.
Galt, D. et al., "Ferroelectric Thin Film Characterization Using Superconducting Microstrip Resonators", IEEE Trans on Appl Superconductivity Jun. 1995 IEEE, pp. 2575-2578, vol. 5, No. 2, Piscataway, NJ, USA.
Gevorgian, Spartak S. et al., "HTS/Ferroelectric Devices for Microwave Applications", IEEE Transactions on Applied Superconductivity, Jun. 1997, pp. 2458-2461, IEEE, USA.
Jose et al., "Experimental investigations on electronically tunable microstrip antennas," Feb. 5, 1999, Microwave and optical technology letters, vol. 20, No. 3, pp. 166-169.
Keis, V. N. et al., "20GHz tunable filter based on ferroelectric (BaSr)TiO3 film varactors", Electronics Letters, May 28, 1998, vol. 34, No. 11, IEE Stevenage, GB.

Kozyrev, A., et al., "Ferroelectric Films: Nonlinear Properties and Applications in Microwave Devices", 1998 IEEE MTT-S Digest, May 1998, pp. 985-988, 1998 IEEE MTT-S Intl Baltimore, MD, USA, IEEE, USA.

Krautkramer, V.W. et al., "Resonanztransformatoren mit drei Reaktanzen als transformierende Filter", Bulletin des Schweizerischen Elektrotechnischen Vereins, Zurich, CH, vol. 64, No. 23, Nov. 10, 1973, pp. 1500-1509, XP002184530.

Toncich et al., "Data Reduction Method for Q Measurements of Stripline Resonators", IEEE Transactions in MTT, vol. 40, No. 9, Sep. 1992, pp. 1833-1836.

Vendik, O.G. et al., "1GHz tunable resonator on bulk single crystal SrTiO3 plated with Yba2Cu307-x films", Electronics Letters, Apr. 13, 1995, pp. 654-656, vol. 31, No. 8, IEE Stevenage, GB.

* cited by examiner

SYSTEM AND METHOD FOR FILTERING TIME DIVISION MULTIPLE ACCESS TELEPHONE COMMUNICATIONS

RELATED APPLICATIONS

This patent application is a divisional patent application of and claims priority to U.S. patent application Ser. No. 10/452,464, entitled "SYSTEM AND METHOD FOR FILTERING TIME DIVISION MULTIPLE ACCESS TELEPHONE COMMUNICATIONS" filed Jun. 2, 2003 now U.S. Pat. No. 7,720,443 and incorporated by reference in its entirety, herein.

BACKGROUND OF THE INVENTION

1. Field of the Invention

This invention generally relates to wireless telephone communications and, more particularly, to a system and method for using a common filter for Time Division Multiple Access (TDMA) transmit and receive communications.

2. Description of the Related Art

FIG. 5 is a schematic block diagram depicting an automatic switch, a transmit bandpass filter, and a receive bandpass filter in a wireless communications device transceiving half duplex communications (prior art). As shown in FIG. 5, wireless devices transceiving half duplex communications typically have a fixed-tuned Tx bandpass filter (BPF) and a fixed-tuned Rx BPF to meet filtering specifications. Current system architecture forces the Tx BPF and the Rx BPF to each have a bandwidth sufficient to accommodate operation of any Tx or Rx single channel in any region of the respective Tx or Rx system band.

These fixed-tuned filters have the contradictory objectives of achieving the lowest possible passband insertion loss (IL) while simultaneously achieving a specified large out-of-band rejection and small size. Selectivity over the full range of the Tx and Rx system passbands is obtained using relatively complex Tx and Rx filters. That is, the order of the filters (number of resonators), is relatively large. High order (greater than $2^{nd}$ order) fixed-tuned filters constructed from either individual coaxial resonator elements or monoblock structures are conventionally used. Complex Tx and Rx BPFs negatively impact a wireless device. First, using a higher order filter quickly increases the IL of the filter. That is, as the number of resonators in the filters increases, the filters become more lossy. In addition, to satisfy out-of-band rejection specifications, a transmission zero is usually required, with the added disadvantage of increasing IL at the band edge. Second, increasing the number of resonators in the filters typically increases the costs for manufacturing the filters. Because of variations in ceramics and fabrication tolerances, vendors must individually adjust the characteristics of fixed-tuned filters during their manufacture, further increasing costs. Third, more complex filters require more space in a wireless device. Regarding the last point, the desire to make smaller devices with increased functionality creates a need to reduce the number or size or both of the components in devices. However, increasing the number or size of filters can limit the size to which a wireless device can be reduced, or can limit space available in the wireless device for other components.

Fixed-tuned BPFs also can act to limit the useable applications for the wireless device containing the BPFs. For example, PCS bands in different geographical areas such as the U.S., Korea, and India have different frequency band specifications. Therefore, if more than one PCS frequency band is to be supported in a wireless device (for example, if the wireless device is to be useable in more than one of the above countries), multiple fixed-tuned BPFs are necessary, further exacerbating the disadvantages noted above. Such multiple BPFs would be necessary even if the power amplifier and low noise amplifier used in the wireless device have sufficient bandwidth to operate over these multiple bands.

It would be advantageous if the width of filter passbands in a wireless device transceiving half duplex communications could be reduced.

SUMMARY OF THE INVENTION

The present invention addresses bandpass filtering in Time Division Multiple Access (TDMA) telephone communications, but is applicable to any half duplex system of wireless communication. The invention recognizes that high order (greater than $2^{nd}$ order) fixed-tuned transmit (Tx) and receive (Rx) bandpass filters (BPFs) are conventionally used in a wireless device transceiving TDMA telephone communications. The invention further recognizes that high order Tx and Rx BPFs are associated with signal power losses, increased manufacturing costs, and increased space requirements. The invention addresses these problems by using a single, tunable ferro-electric BPF (FE BPF) to replace both the Tx BPF and the Rx BPF in a wireless device transceiving TDMA telephone communications. Use of a single FE BPF allows a reduction in the width of required filter passbands and, subsequently, a reduction in required filter order.

Accordingly, a system is presented for transceiving TDMA telephone communications through a common filter. The system includes a tunable FE BPF, a controller, a low noise amplifier (LNA), and a power amplifier (PA). The FE BPF has two signal ports and a control input to accept tuning voltage signals from the controller. In response to the tuning voltage signals, the FE BPF selects a Tx or Rx frequency passband between the signal ports. The FE BPF first signal port is connected to the LNA and the PA and the FE BPF second signal port is connected to an antenna in the wireless device. The controller also supplies activation and deactivation control signals. In response to an activation control signal, the LNA amplifies communications received by the wireless device transceiver and filtered by the FE BPF. In response to an activation control signal, the PA amplifies communications generated in the wireless device for filtering by the FE BPF and transmission from the wireless device. The controller coordinates the selection of Tx and Rx passbands and the functions of the LNA and PA. For example, when the wireless device is receiving communications, an Rx passband is selected, the LNA is activated, and the PA is deactivated.

Additional details of the above-described system, and a method for transceiving TDMA telephone communications through a common filter are provided below.

DETAILED DESCRIPTION OF THE PREFERRED EMBODIMENTS

Figure 1:
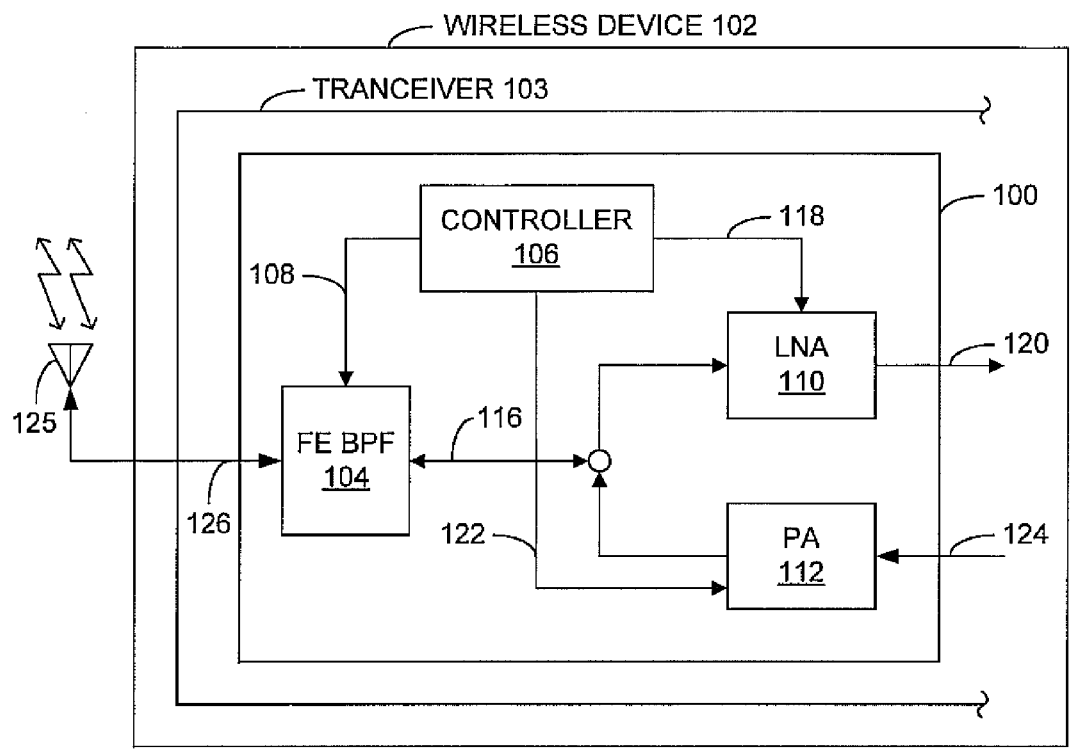
FIG. 1 is a schematic block diagram depicting the system for transceiving Time Division Multiple Access (TDMA) telephone communications through a common filter in accordance with the present invention.

FIG. 1 is a schematic block diagram depicting the system 100 for transceiving Time Division Multiple Access (TDMA) telephone communications through a common filter in accordance with the present invention. The system 100 is applicable to a wireless communications device 102 using the TDMA standard and including a transceiver 103. However, the system 100 is not limited to just telephone communications and has application for use in any half duplex communication system. The system 100 includes a tunable Ferroelectric bandpass filter (FE BPF) 104 with a control input, a first signal port, and a second signal port. A controller 106 has an output connected to the FE BPF 104 control input on line 108 to supply tuning voltage signals. The FE BPF 104 alternately selects transmit (Tx) and receive (Rx) passbands in response to control signals received on line 108.

Figure 2:
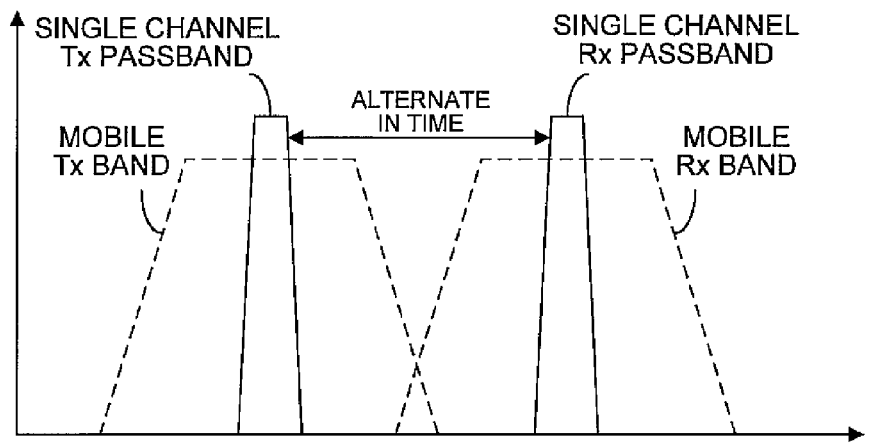
FIG. 2 is a graph showing an example of the use of the invention system to provide Tx and Rx channels for transceiving TDMA telephone communications in a wireless device.
Figure 5:
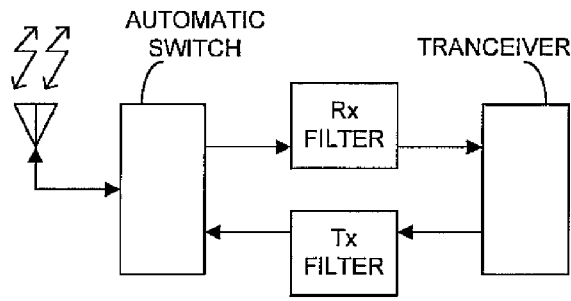
FIG. 5 is a schematic block diagram depicting an automatic switch, a transmit bandpass filter, and a receive bandpass filter in a wireless communications device transceiving half duplex communications (prior art).

FIG. 2 is a graph showing an example of the use of the invention system 100 to provide Tx and Rx channels for transceiving TDMA telephone communications in a wireless device. The horizontal axis in FIG. 2 is frequency and the vertical axis in FIG. 2 is a unitless signal magnitude. Neither axis is scaled. In general, a lower order, single, tunable BPF, supplying single channel passbands, can replace high order (greater than $2^{nd}$ order) fixed-tuned Tx and Rx BPFs in those cases where the fixed-tuned BPFs cover a mobile bandwidth that is greater than the bandwidth required for transmission or reception of a single channel. That is, the FE BPF can be tuned to cover the entire band of interest by establishing a single channel Tx or Rx passband anywhere within the Tx or Rx mobile bands. In particular, the FE BPF 104 can replace the wideband fixed-tuned Tx and Rx BPFs shown in FIG. 5. The fixed-tuned Tx and Rx BPFs each have a mobile bandwidth at least equal to 60 MHz and a single TDMA Tx or Rx channel has a narrower passband with a width of only 30 KHz. The FE BPF 104 can be tuned to produce, alternately in time, Tx and Rx 30 KHz single channel bandwidths, anywhere within the respective 60 MHz Tx and Rx mobile bands to accommodate telephone communications from and to the wireless device 102. Producing these single channels across the entire Tx and Rx mobile bands duplicates the function of the Tx and Rx BPFs, allowing the FE BPF 104 to replace the Tx and Rx BPFs. The FE BPF 104 is typically a $1^{st}$ or $2^{nd}$ order filter and typically has lower insertion loss (IL) for a given resonator size and type than a fixed-tuned BPF design of higher order, such as the Tx BPF and the Rx BPF in FIG. 5. In FIG. 2, a typical, individual Tx channel passband in a first moment in time is shown within the mobile Tx band and a typical, individual Rx channel passband in a second moment in time, differing from the first moment, is shown within the mobile Rx band.

The system 100 also includes a low noise amplifier (LNA) 110 and a power amplifier (PA) 112. The LNA 110 has an input connected to the first FE BPF signal port on line 116, a control input connected to the controller 106 on line 118, and an output connected to line 120. The PA 112 has an output connected to the first FE BPF 104 signal port on line 116, a control input connected to the controller 106 on line 122, and an input connected to line 124. The controller 106 supplies activation and deactivation control signals on lines 118 and 122. The second FE BPF 104 signal port is connected to antenna 125 on line 126.

The controller 106 coordinates the operation of the system 100 through the tuning voltage signals and the activation and deactivation control signals. The following sequence illustrates the operation of the system 100. It is understood that other sequences are possible. In response to the transceiver 103 receiving a communication signal, the controller 106 supplies a tuning voltage signal on line 108 selecting an appropriate single channel Rx passband in FE BPF 104 for the received communication. The antenna 125 supplies the received communication to the FE BPF 104 on line 126, the FE BPF 104 filters the communication, and the FE BPF 104 supplies the filtered communication on line 116. The controller 106 also supplies an activation control signal on line 118 activating the LNA 110 and supplies a deactivation control signal on line 122 deactivating the PA 112. The LNA 110 amplifies the communication on line 116 and supplies the amplified communication to the wireless device 102 on line 120.

In response to the PA 112 receiving a communication from the wireless device 102 on line 124 for transmission by the transceiver 103, the controller 106 supplies an activation control signal on line 122 activating the PA 112 and supplies a deactivation control signal on line 118 deactivating the LNA 110. The PA 112 supplies the amplified communication to the FE BPF 104 on line 116. The controller 106 sends a tuning voltage signal to the FE BPF 104 on line 108 selecting an appropriate single channel Tx passband for the amplified communication on line 116. In this example, the single channel passband generated by the FE BPF 104 is moved from the frequency of the Rx channel noted above to the frequency for the Tx channel required for the communication accepted by the PA 112 on line 124. The FE BPF 104 filters the communication and supplies, on line 126, the filtered communication for transmission by the antenna 125.

A first order FE BPF 104 can be implemented by using a variable capacitance capacitor and a resonator (not shown). The variable capacitance capacitor is constructed using a ferro-electric material having a variable dielectric constant responsive to the tuning voltage on line 108. The resonator has a fixed inductance. The FE BPF 104 resonates at a frequency in response to the capacitor and the resonator. The capacitance of the capacitor is adjusted by varying the ferroelectric material dielectric constant responsive to the tuning voltage. Adjusting the capacitance of the capacitor changes the resonant frequency of the resonator (and hence the passband for FE BPF 104), providing the tunability for FE BPF 104. In some aspects of the system, a volumetric resonator (not shown) is used. If a second order FE BPF 104 is required, a second variable capacitance capacitor and resonator are added to the FE BPF 104.

Examples of volumetric resonators applicable to the system 100 include, but are not limited to, monoblock, stripline, microstrip, and coaxial dielectric loaded resonators. The use of capacitors, resonators and ferro-electric material to adjust resonant frequency is fully described in a pending application, Ser. No. 09/912,753, entitled "Tunable Multiplexer", invented by Stanly S. Toncich, filed on Jul. 24, 2001, which is incorporated herein by reference.

The FE BPF 104 also can be implemented by using a tunable resonator (not shown). The tunable resonator includes a capacitor and an inductor (not shown) arranged to produce a resonant frequency. The capacitor is a variable capacitance capacitor. The variable capacitance capacitor is constructed using a ferro-electric material having a variable dielectric constant responsive to the tuning voltage on line 108. The FE BPF 104 resonates at a frequency in response to the capacitor and the inductor. The capacitance of the capacitor is adjusted by varying the ferro-electric material dielectric constant responsive to the tuning voltage. Adjusting the capacitance changes the resonant frequency of the resonator (and hence the passband for FE BPF 104), providing the tunability for FE BPF 104.

Examples of tunable resonators applicable to the system 100 include, but are not limited to, monoblock, stripline, microstrip, and coaxial dielectric loaded resonators. The use of tunable resonators is described in a pending application, Ser. No. 09/927,136, entitled "Tunable Matching Circuit", invented by Stanly S. Toncich, filed on Aug. 10, 2001, which is incorporated herein by reference.

Figure 3:
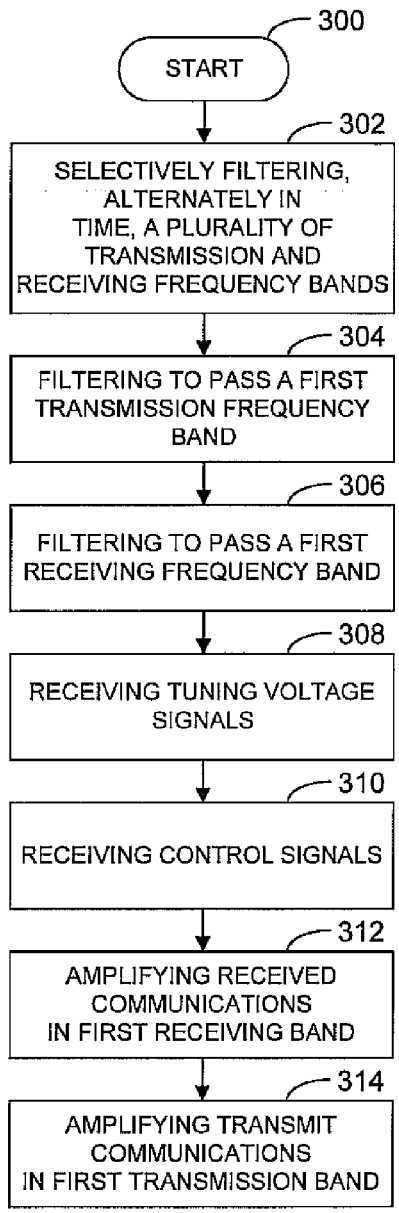
FIG. 3 is a flow chart illustrating the method for transceiving TDMA telephone communications through a common filter in accordance with the present invention.

FIG. 3 is a flow chart illustrating the method for transceiving TDMA telephone communications through a common filter in accordance with the present invention. Although the method in FIG. 3 (and FIG. 4 below) is depicted as a sequence of numbered steps for clarity, no order should be inferred from the numbering unless explicitly stated. The method starts at Step 300. Step 302 selectively filters, alternately in time, a plurality of transmission frequency bands and receiving frequency bands, the frequencies of the transmission bands differing from the frequencies of the receiving bands. Step 304 filters to pass a first transmission frequency band from among a plurality of differing transmission frequency bands. Step 306 filters to pass a first receiving frequency band from among a plurality of differing receiving frequency bands. Step 308 receives tuning voltage signals. Step 310 receives control signals. Step 312 amplifies received communications in the first receiving frequency band in response to the control signals. Step 314 amplifies transmit communications in the first transmission frequency band in response to the control signals.

Figure 4:
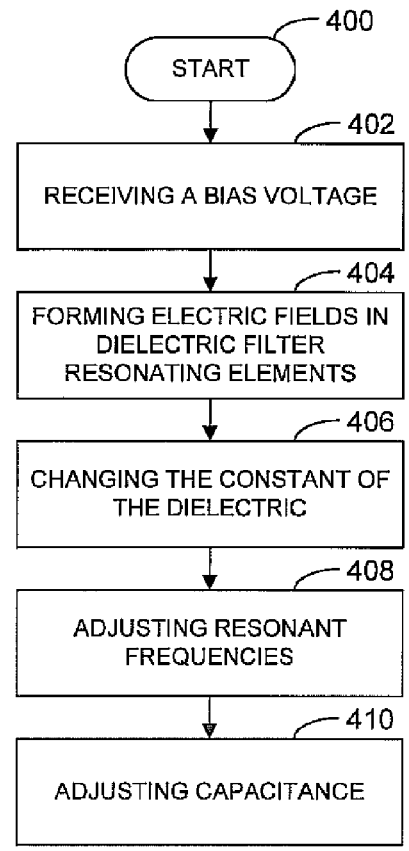
FIG. 4 is a flow chart further illustrating the method shown in FIG. 3.

FIG. 4 is a flow chart further illustrating the method shown in FIG. 3. The method starts at Step 400. Step 402 receives a bias voltage. Step 404 forms electrical fields in dielectric separating filter resonating elements. Step 406 changes the constant of the dielectric in response to the bias voltage. Step 408 adjusts resonant frequencies in response to changing the dielectric constant. Step 410 adjusts capacitance.

A system and a method are provided for transceiving TDMA telephone communications through a common filter in accordance with the present invention. Examples of the present invention have been enabled with U.S. TDMA PCS. However, it should be understood that the present invention is not limited to U.S. TDMA PCS. The techniques, methods, and devices taught herein are applicable to other time multiplexed systems using a plurality of selectable receiver channels, a plurality of selectable transmission channels, or a plurality of selectable transmit and receive channels. Although the invention has been described with reference to particular embodiments, the description is only an example of the invention's application and should not be taken as a limitation. Consequently, various adaptations and combinations of features of the embodiments disclosed are within the scope of the invention as encompassed by the following claims. Other variations and embodiments of the present invention will occur to those skilled in the art.

We claim:

1. A method for transceiving Time Division Multiple Access (TDMA) telephone communications through a common filter in a wireless communications device, the method comprising:

adjusting a transmitting resonant frequency in response to a tuning voltage signal;

turning on a power amplifier (PA) in response to a power amplifier (PA) activation signal, wherein the PA amplifies signals for transmission with a tunable ferro-electric band pass filter (FE BPF) in response to the PA activation signal;

turning off a low noise amplifier (LNA) in response to a LNA deactivation signal;

after the power amplifier is turned on and the LNA is turned off, transmitting transmission communications in the adjusted transmitting resonant frequency band;

turning off the power amplifier in response to a power amplifier deactivation signal;

adjusting a receiving resonant frequency, different from the transmitting resonant frequency, in response to the tuning voltage signal;

turning on the low noise amplifier (LNA) in response to a LNA activation signal; and, after the power amplifier is turned off and the LNA is turned on, receiving communications in the adjusted receiving resonant frequency band.

2. A method for transceiving Time Division Multiple Access (TDMA) telephone communications through a common filter, the method comprising:

selectively filtering to produce transmitter frequency passbands and receiver frequency passbands, different than the receiver frequency passbands;

at a first time, transmitting filtered communications in the transmitter frequency passband, when a power amplifier (PA) is on and an LNA is off, wherein the PA amplifies signals for transmission in a tunable, ferro-electric band pass filter (FE BPF) in response to the PA being on; and, at a second time, different than the first time, receiving communications in the receiver frequency passband, when the power amplifier (PA) is off and the LNA is on.

3. A method comprising:

when a common filter is tuned to a transmission frequency band, deactivating a low noise amplifier (LNA) and activating a power amplifier (PA) to transmit Time Division Multiple Access (TDMA) telephone transmission communications through the common filter, wherein the PA amplifies signals for transmission in a tunable, ferro-electric band pass filter (FE BPF) in response to activating the PA; and when the common filter is tuned to a receiving frequency band, deactivating the power amplifier (PA) and activating the low noise amplifier (LNA) to receive TDMA telephone transmission communications through the common filter.

4. The method of claim 3, further comprising:

tuning the common filter to the transmission frequency band; and alternately in time to tuning the common filter to the transmission frequency band, tuning the common filter to the receiving frequency band.

5. The method of claim 4, wherein:

tuning the common filter to the transmission frequency band comprises filtering to pass the transmission frequency band from among a plurality of differing transmission frequency bands; and tuning the common filter to the receiving frequency band comprises filtering to pass the receiving frequency band from among a plurality of differing receiving frequency bands.

6. The method of claim 1, wherein the LNA amplifies communications supplied by the tunable FE BPF in response to the LNA activation signal.

7. A method for transceiving Time Division Multiple Access (TDMA) telephone communications through a common filter in a wireless communications device, the method comprising:
  adjusting a transmitting resonant frequency in response to a tuning voltage signal;
  turning on a power amplifier (PA) in response to a power amplifier (PA) activation signal;
  turning off a low noise amplifier (LNA) in response to a LNA deactivation signal;
  after the power amplifier is turned on and the LNA is turned off, transmitting transmission communications in the adjusted transmitting resonant frequency band;
  turning off the power amplifier in response to a power amplifier deactivation signal;
  adjusting a receiving resonant frequency, different from the transmitting resonant frequency, in response to the tuning voltage signal;
  turning on the low noise amplifier (LNA) in response to a LNA activation signal, wherein the LNA amplifies communications supplied by a tunable, ferro-electric band pass filter (FE BPF) in response to the LNA activation signal; and,
  after the power amplifier is turned off and the LNA is turned on, receiving communications in the adjusted receiving resonant frequency band.

8. The method of claim 7, wherein the PA amplifies signals for transmission in a tunable, ferro-electric band pass filter (FE BPF) in response to the PA activation signal.

9. The method of claim 2, wherein the LNA amplifies communications supplied by a tunable, ferro-electric band pass filter (FE BPF) in response to the LNA being on.

10. A method for transceiving Time Division Multiple Access (TDMA) telephone communications through a common filter, the method comprising:
  selectively filtering to produce transmitter frequency passbands and receiver frequency passbands, different than the receiver frequency passbands;
  at a first time, transmitting filtered communications in the transmitter frequency passband, when a power amplifier (PA) is on and an LNA is off; and,
  at a second time, different than the first time, receiving communications in the receiver frequency passband, when the power amplifier (PA) is off and the LNA is on, wherein the LNA amplifies communications supplied by a tunable, ferro-electric band pass filter (FE BPF) in response to the LNA being on.

11. The method of claim 10, wherein the PA amplifies signals for transmission in the tunable FE BPF in response to the PA being on.

12. A method comprising:
  when a common filter is tuned to a transmission frequency band, deactivating a low noise amplifier (LNA) and activating a power amplifier (PA) to transmit Time Division Multiple Access (TDMA) telephone transmission communications through the common filter; and
  when the common filter is tuned to a receiving frequency band, deactivating the power amplifier (PA) and activating the low noise amplifier (LNA) to receive TDMA telephone transmission communications through the common filter, wherein the LNA amplifies communications supplied by a tunable, ferro-electric band pass filter (FE BPF) in response to activating the LNA.

13. The method of claim 12, further comprising:
  tuning the common filter to the transmission frequency band; and
  alternately in time to tuning the common filter to the transmission frequency band, tuning the common filter to the receiving frequency band.

14. The method of claim 13, wherein:
  tuning the common filter to the transmission frequency band comprises
  filtering to pass the transmission frequency band from among a plurality of differing transmission frequency bands; and
  tuning the common filter to the receiving frequency band comprises filtering to pass the receiving frequency band from among a plurality of differing receiving frequency bands.

* * * * *